United States Patent
Yen et al.

(10) Patent No.: US 9,143,391 B2
(45) Date of Patent: Sep. 22, 2015

(54) METHOD OF PROCESSING MANAGEMENT FRAME AND RELATED COMMUNICATION DEVICE

(75) Inventors: Chia-Wei Yen, Taipei (TW); Jian-Li Mao, Suzhou (CN)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 325 days.

(21) Appl. No.: 13/563,742

(22) Filed: Aug. 1, 2012

(65) Prior Publication Data

US 2013/0044750 A1     Feb. 21, 2013

Related U.S. Application Data

(60) Provisional application No. 61/523,408, filed on Aug. 15, 2011.

(51) Int. Cl.
*H04L 12/24*     (2006.01)
*H04L 12/741*     (2013.01)
*H04L 29/06*     (2006.01)
*H04L 12/46*     (2006.01)

(52) U.S. Cl.
CPC ............ *H04L 41/00* (2013.01); *H04L 12/4641* (2013.01); *H04L 45/74* (2013.01); *H04L 45/745* (2013.01); *H04L 69/22* (2013.01)

(58) Field of Classification Search
CPC ........................ H04L 61/6022; H04L 41/00
USPC ............ 370/248, 254, 351, 392, 295.53, 400, 370/401; 709/228, 245
See application file for complete search history.

(56) References Cited

U.S. PATENT DOCUMENTS

| | | | | |
|---|---|---|---|---|
| 5,617,421 | A * | 4/1997 | Chin et al. | 370/402 |
| 6,574,240 | B1 * | 6/2003 | Tzeng | 370/469 |
| 6,804,202 | B1 * | 10/2004 | Hwang | 370/282 |
| 7,274,695 | B2 * | 9/2007 | Kim et al. | 370/389 |
| 7,379,451 | B1 * | 5/2008 | Brebner | 370/356 |
| 7,394,758 | B2 * | 7/2008 | Gonda | 370/218 |
| 7,457,300 | B2 * | 11/2008 | Christensen et al. | 370/401 |
| 7,693,152 | B2 * | 4/2010 | Deng | 370/392 |
| 8,018,857 | B2 * | 9/2011 | Gonda | 370/241.1 |
| 2002/0152323 | A1 * | 10/2002 | Ono et al. | 709/245 |
| 2002/0167950 | A1 * | 11/2002 | Chang et al. | 370/396 |
| 2003/0039260 | A1 * | 2/2003 | Fujisawa | 370/401 |
| 2004/0156375 | A1 * | 8/2004 | Takabatake | 370/401 |
| 2008/0008148 | A1 * | 1/2008 | Sagawa | 370/338 |
| 2008/0107109 | A1 * | 5/2008 | Michaud | 370/390 |
| 2008/0175265 | A1 * | 7/2008 | Yonge et al. | 370/447 |
| 2009/0034525 | A1 * | 2/2009 | Wu | 370/389 |
| 2009/0225675 | A1 * | 9/2009 | Baum et al. | 370/252 |
| 2010/0189114 | A1 * | 7/2010 | Oishi et al. | 370/400 |
| 2011/0002337 | A1 * | 1/2011 | Akahane et al. | 370/395.53 |
| 2011/0205972 | A1 * | 8/2011 | Yuk et al. | 370/328 |
| 2011/0225308 | A1 * | 9/2011 | Yamaura et al. | 709/228 |
| 2012/0177044 | A1 * | 7/2012 | Berman | 370/392 |
| 2012/0311683 | A1 * | 12/2012 | Klein et al. | 726/6 |

* cited by examiner

*Primary Examiner* — Andrew Lai
*Assistant Examiner* — Andrew C Lee
(74) *Attorney, Agent, or Firm* — Winston Hsu; Scott Margo (57) ABSTRACT

A method of processing management frame for a first communication device in a network system is disclosed. The method comprises maintaining a device table including at least an identity of at least a communication device of the network system, and at least a medium access control (MAC) address corresponding to the identity, and determining whether to perform management frame transmission to a second communication device of the network system according to the existence of the identity of the second communication device in the device table.

18 Claims, 7 Drawing Sheets

METHOD OF PROCESSING MANAGEMENT FRAME AND RELATED COMMUNICATION DEVICE

CROSS REFERENCE TO RELATED APPLICATIONS

This application claims the benefit of U.S. Provisional Application No. 61/523,408, filed on Aug. 15, 2011, entitled "Management Frame Process Method based on MAC Abstraction Sub-layer", the contents of which are incorporated herein in their entirety.

BACKGROUND

With rapidly growing of user's needs for accessing digital contents everywhere, various communication technologies have been developed for transmission of the digital contents. These communication technologies may be developed for different environments, different transmission speeds and/or different user requirements. In addition, several medium access control (MAC) protocols are established based on different communication standards, which define different communication methods based on heterogeneous mediums. For example, IEEE 1901 communication standard is used for power line (PLC), IEEE 802.11 communication standard is used for wireless communication (i.e. WiFi), IEEE 802.3 communication standard is used for Ethernet, and Multimedia over Coax Alliance (MoCA) communication standard is used for coaxial cables, and so on.

Figure 1:
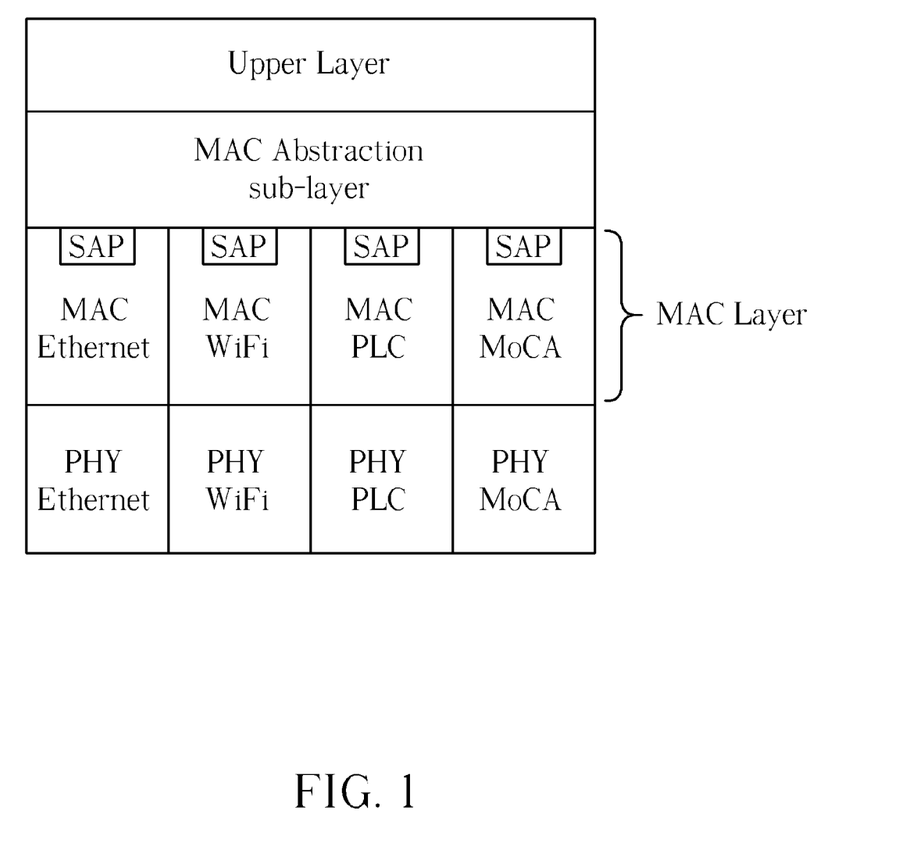
FIG. 1 is a schematic diagram of a communication device according to the prior art.

As a result, a MAC abstraction sub-layer is developed for convergence of these various media. Please refer to FIG. 1, which is a schematic diagram of an exemplary communication device 10 in a data plane. The communication device 10 may be a mobile phone, laptop, tablet computer, electronic book, modem, or portable computer system, and uses various media for communication. In FIG. 1, the MAC abstraction sub-layer is arranged between an upper layer and a plurality of MAC types of a MAC layer each corresponding to a medium specification (i.e. PLC MAC, WiFi MAC, MoCA MAC, or Ethernet MAC). Each of the MAC types of the MAC layer includes a service access point (SAP), such that the MAC abstraction sub-layer can communicate with the MAC layer via the corresponding SAPs. The upper layer can be a network layer, a transport layer, an application layer or any layer responsible for processing the signalings and the packets received from the MAC abstraction sub-layer, and signalings and packets to be transmitted via the MAC abstraction sub-layer. In addition, the communication device 10 in the data plane includes a plurality of PHY types of a PHY layer. The plurality of PHY types of the PHY layer include an Ethernet PHY, an WiFi PHY, a PLC PHY and a MoCA PHY, which is complied with the IEEE 802.3 communication standard, IEEE 802.11 communication standard, IEEE 1901 communication standard and MoCA communication standard, respectively. Thus, the packet of the WiFi MAC, Ethernet MAC, PLC MAC or MoCA MAC can be received/transmitted through a corresponding PHY type of the PHY layer.

Further, the MAC abstraction sub-layer provides management functions (i.e. device management, or QoS negotiation) between communication devices. To implement management functions, some management frame should be exchanged between communication devices. However, there is no guideline for management frame process. Without clear specification, the MAC abstraction sub-layer may not know how to generate management frames and exchange management frames. In addition, management frame format, management frame delivery path, and management frame exchange flow are not defined for management functions.

SUMMARY

The present invention therefore provides a method of processing management frame and related communication device, to solve the abovementioned problems.

The present invention discloses a method of processing management frame for a first communication device in a network system. The method comprises storing a device table including at least an identity of at least a communication device of the network system, and at least a medium access control (MAC) address corresponding to the identity, and determining whether to perform management frame transmission to a second communication device of the network system according to the existence of the identity of the second communication device in the device table.

The present invention further discloses a first communication device of a network system for processing management frame. The first communication device comprises a storage unit, for storing a device table including at least an identity of at least a communication device of the network system, and at least a medium access control (MAC) address corresponding to the identity, and a management frame processor module, coupled to the storage unit, for determining whether to perform management frame transmission to a second communication device of the network system according to the existence of the identity of the second communication device in the device table.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
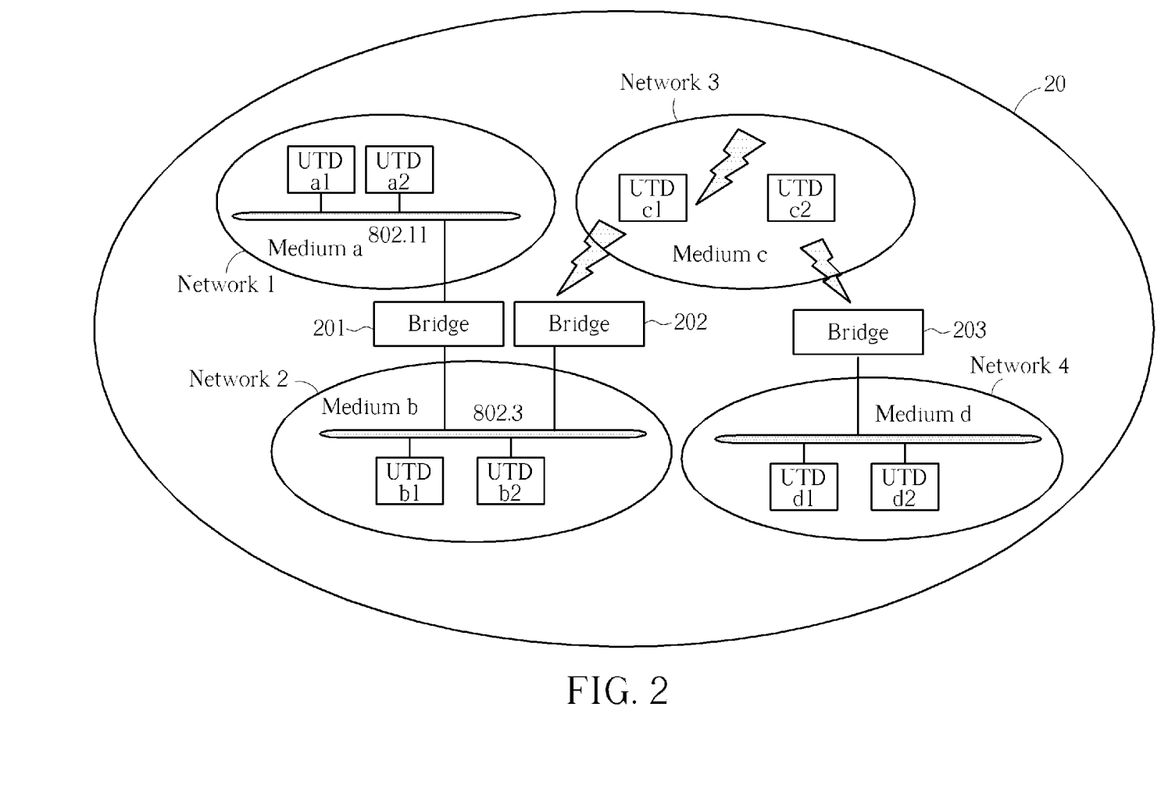
FIG. 2 is a schematic diagram of an exemplary network system according to an example of the present invention.

Please refer to FIG. 2, which is a schematic diagram of an exemplary network system 20 according to the present invention. In FIG. 2, the network system 20 includes networks 1-4 each complied with a communication standard, such as IEEE 1901, IEEE 802.11, IEEE 802.3 or Multimedia over Coax Alliance (MoCA), and bridges 201-203 for communications between the networks 1-4. Every communication standard defines a communication method based on a medium. For example, IEEE 1901 is used for power line (PLC), IEEE 802.11 is used for wireless communication (i.e. WiFi), IEEE 802.3 is used for Ethernet, and Multimedia over Coax Alliance (MoCA) is used for coaxial cables. Therefore, within the network 1, unified terminal devices (UTDs) a1-a2 communicate to each other or to the network 1 via a medium Medium a. Within in the network 2, unified terminal devices b1-b2 communicates to each other or to the network 2 via a medium Medium b, and so on. Further, the unified terminal devices a1-a2, b1-b2, c1-c2, and d1-d2 with different communication mediums communicate with others via the bridges 201-203. For instance, unified terminal devices b1-b2 communicate with unified terminal devices a1-a2 via bridge 201, communicate with unified terminal devices c1-c2 via the bridge 202, and unified terminal devices d1-d2 communicate with unified terminal devices c1-c2 via the bridge 203. Note that, the unified terminal devices a1-a2, b1-b2, c1-c2, and d1-d2 can be mobile phones, laptops, tablet computers, electronic books, modems, and portable computer systems, etc.

Figure 3:
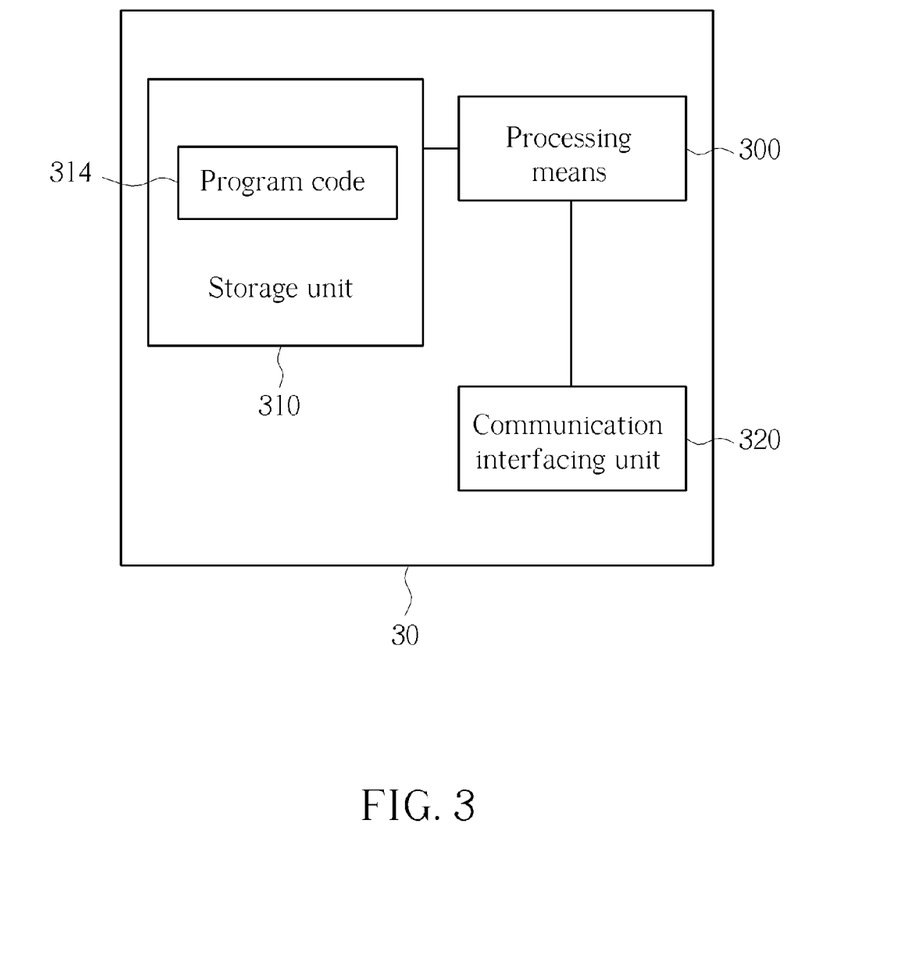
FIG. 3 is a schematic diagram of an exemplary communication device according to an example of the present invention.

Please refer to FIG. 3, which is a schematic diagram of an exemplary communication device 30 according to the present invention. The communication device 30 can be a unified terminal device shown in FIG. 2. The communication device 30 may include a processor 300 such as a microprocessor or an Application Specific Integrated Circuit (ASIC), a storage unit 310 and a communication interfacing unit 320. The storage unit 310 may be any data storage device that can store a program code 314, accessed by the processor 300. Examples of the storage unit 310 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 320 is preferably a transceiver and can exchange signals with a unified terminal device or the network according to processing results of the processor 300.

Note that, the main feature of the present invention is to provide a management frame process in a MAC abstraction sub-layer of a unified terminal device. To achieve this goal, a management frame process module is provided in the unified terminal device. In addition, a device table including at least two elements, device identity (hereafter called DID) and medium access control (MAC) address, is provided in the unified terminal device, wherein the DID is used for identification of a unified terminal device. The device table may be stored in the storage unit 310 of the communication device 30.

As to management frame exchange, a DID of a destination unified terminal device, with which a source unified terminal device performs management frame exchange, is checked by the management frame process module. By lookup the device table with the DID, the management frame process module gets a MAC address of the destination unified terminal device. This makes management frame can be sent out unicast. In addition, a management frame may include elements like destination device identity (DDID), source device identity (SDID), management frame type (MFT), management function class, management function type, sequence number (SN), management function data. In detail, the management function class is used for indicating which management function is performed. For example, "1" represents device management, and "2" represents QoS. The management function type is used for indicating sub-type of the management function class. The management function data may be parameters, which are transmitted to destination unified terminal device by this frame, and depends on different management function classes and management function types.

Figure 4:
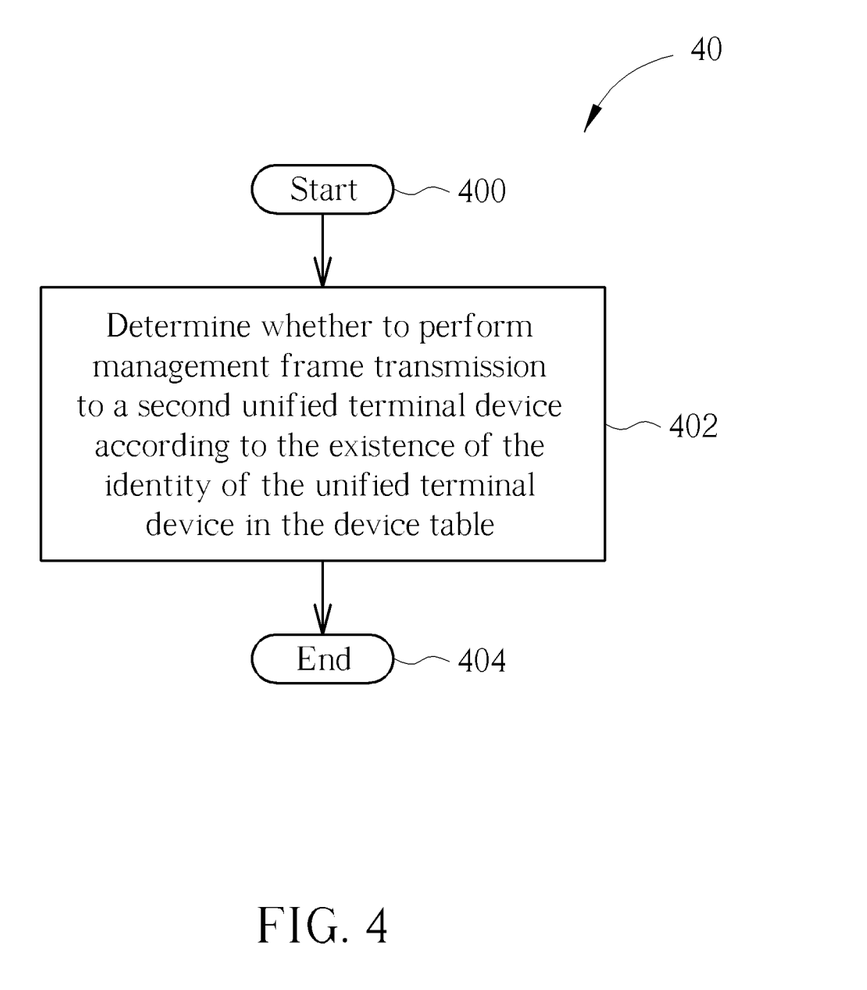
FIG. 4 is a flowchart of a process according to an example of the present invention.

Please refer to FIG. 4, which is a flowchart of a process 40 according to an example of the present invention. The process 40 is utilized in a first unified terminal device shown in FIG. 2, for processing management frame. The process 40 may be compiled into the program code 214 of FIG. 3 and includes the following steps:

Step 400: Start.

Step 402: Determine whether to perform management frame transmission to a second unified terminal device according to the existence of the identity of the unified terminal device in the device table.

Step 404: End.

According to the process 40, a source unified terminal device first checks whether a DID of a destination unified terminal device is included in the device table. If yes, the source unified terminal device performs management frame exchange with the destination unified terminal device. Otherwise, the source unified terminal device drops the management frame.

Figure 5:
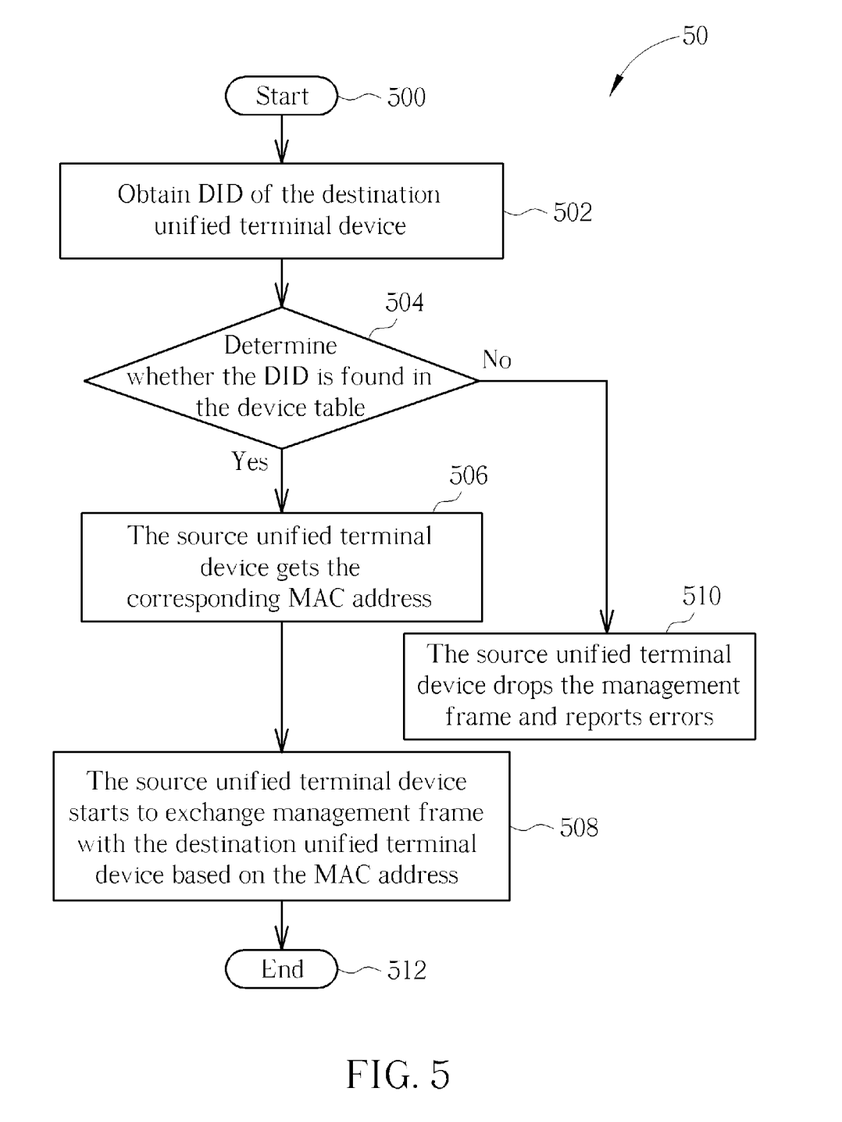
FIG. 5 is a flowchart of a management frame process according to an example of the present invention.

Please refer to FIG. 5, which illustrates a management frame process 50 according to an example of the present invention. Note that, the process 40 and the management frame process 50 can be realized by the abovementioned management frame process module. A source unified terminal device performs management frame exchange with a destination unified terminal device (step 502). A DID of the destination unified terminal device is obtained by the management frame process module of the source unified terminal device. Then, the source unified terminal device looks up the device table to find the DID of the destination unified terminal device (step 504). If the DID is successfully found in the device table, the source unified terminal device gets the corresponding MAC address of the destination unified terminal device (step 506). After that, the source unified terminal device starts to exchange management frame with the destination unified terminal device based on the MAC address (step 508). On the other hand, if the DID is not found in the device table, the source unified terminal device drops the management frame and reports errors to the corresponding function modules of the source unified terminal device (step 510).

Figure 6:
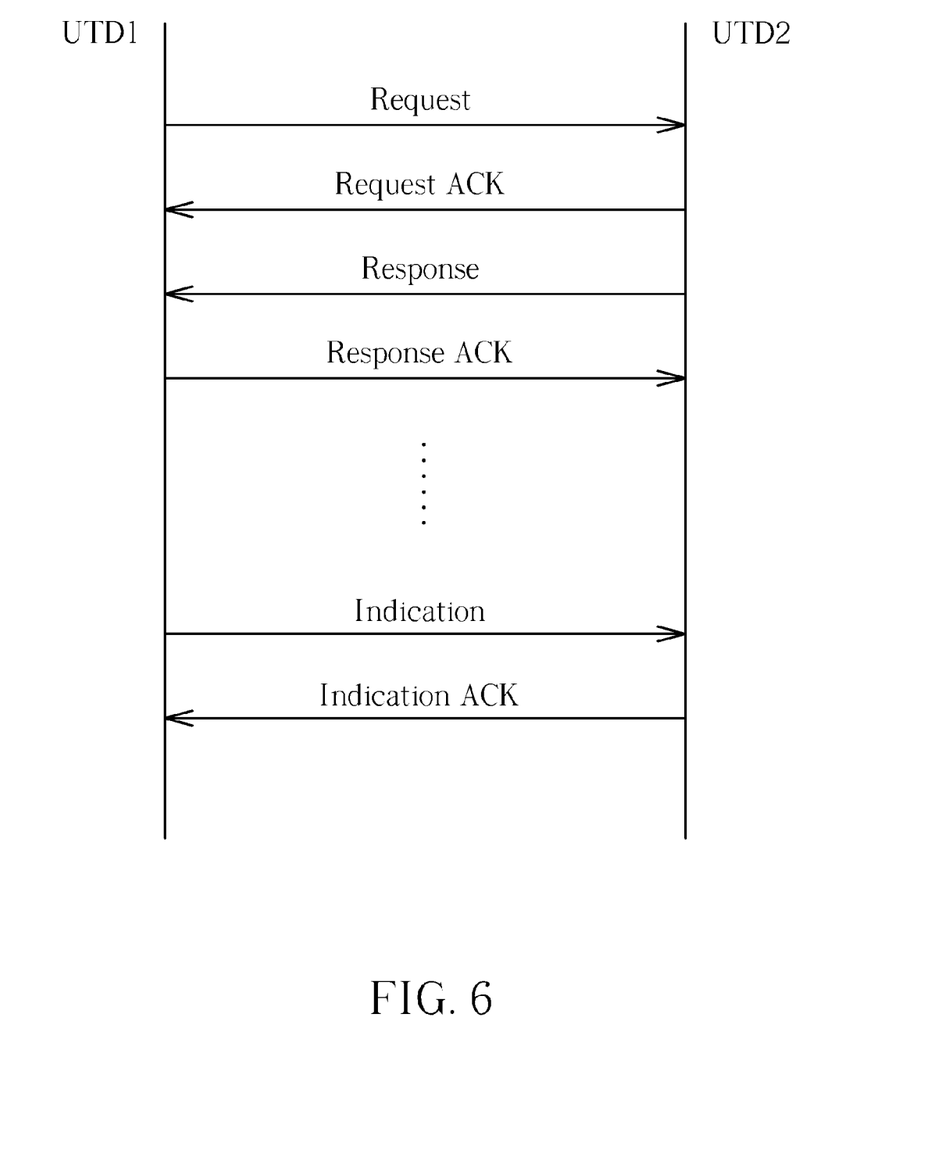
FIG. 6 is a schematic diagram of a management frame exchange flow according to an example of the present invention.

Further, please refer to FIG. 6, which illustrates a management frame exchange flow between the source unified terminal device UTD1 and the destination unified terminal device UTD2. In FIG. 6, the source unified terminal device UTD1 transmits a request frame to the destination unified terminal device UTD2, and the destination unified terminal device UTD2 responses a request acknowledgement (ACK) frame to the source unified terminal device UTD1 if successfully receiving the request frame from the source unified terminal device UTD1. In addition, the destination unified terminal device UTD2 transmits a response frame corresponding to the request frame to the source unified terminal device UTD1, and the source unified terminal device UTD1 responses a response ACK frame to the destination unified terminal device UTD2 if successfully receiving the response frame from the destination unified terminal device UTD2. Besides, the source unified terminal device UTD1 may transmit an indication frame to the destination unified terminal device UTD2, and the destination unified terminal device UTD2 responses an indication ACK frame to the source unified terminal device UTD1 if successfully receiving the indication frame from the source unified terminal device UTD1.

As can be seen, there are six management frame types defined for the management frame exchange. The first four handshaking (i.e. request, request acknowledgement, response, and response acknowledgement) is used to achieve request purpose. The last two handshaking (i.e. indication, indication acknowledgement) is used to achieve a notification purpose. More specifically, the request frame is used to request the destination unified terminal device UTD2 to do something (i.e. get a parameter or set a parameter). The response frame is used to reply the request frame (i.e. response with a parameter value or response with the parameter setting result). On the other hand, the indication frame is used to notice destination unified terminal device UTD2 something has happened in the source unified terminal device UTD1 (i.e. a parameter is changed by user configuration).

Figure 7:
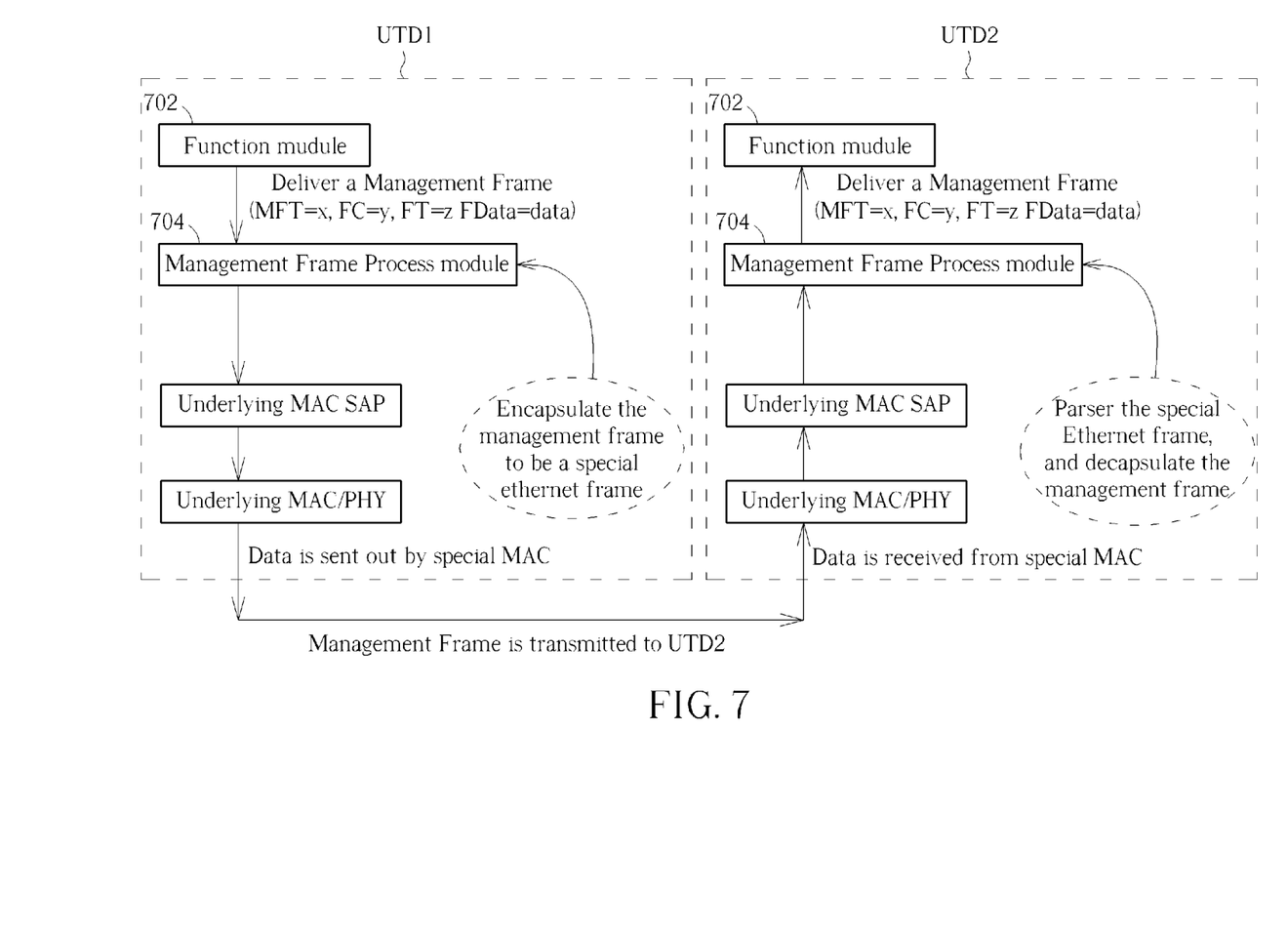
FIG. 7 is a schematic diagram of a management frame delivery path according to an example of the present invention.

In addition, the abovementioned management frame exchange flow is performed via a data path. Please refer to FIG. 7, which illustrates a management frame delivery path according to an example of the present invention. In FIG. 7, the function module 702 is an implement for realizing functions (i.e. device management module) of an upper layer as shown in FIG. 1. However, it should be noted that there is no limitation on the implementation of the function module. It can also be used to realize functions of an MAC abstraction sub-layer. The management frame process module 704 is an implement for realizing functions (i.e. encapsulate device management frame to special Ethernet type frame) of the MAC abstraction sub-layer. A management frame is going to be transmitted from the source unified terminal device UTD1 to the destination unified terminal device UTD2. The management frame process module 704 of the source unified terminal device UTD1 receives a management frame including elements of management frame type MFT, management function class FC, and management function type FData, from a function module 702 of the source unified terminal device UTD1. The management frame process module 704 of the source unified terminal device UTD1 encapsulates the received management frame into a Ethernet type frame, and delivers it to the underlying MAC layer with the corresponding MAC service access point (SAP) (referring back to FIG. 1). After the management frame is received by the MAC layer of the source unified terminal device UTD1 with the corresponding MAC SAP, the MAC layer delivers the management frame to the PHY layer of the source unified terminal device UTD1. Thus, the PHY layer of the source unified terminal device UTD1 transmits the management frame to the PHY layer of the destination unified terminal device UTD2. As can be seen, after the management frame process module 704 of the destination unified terminal device UTD2 receives the management frame from the underlying PHY layer, MAC layer and MAC SAP, the management frame process module 704 of the destination unified terminal device UTD2 parses the management frame with Ethernet type frame and then gets the management frame. Note that, it is necessary to define a special Ethernet type for management frame, so that the management frame can be separated from general data frame and recognized by management frame process module 704 correctly.

Please note that, those skilled in the art may realize the management frame process by means of software, hardware or their combinations. More specifically, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method and apparatus for handling management frame. More specifically, a management frame format, a management frame delivery path and a management frame exchange flow are clearly defined in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of processing management flame for a first communication device in a network system, the method comprising:
storing a device table including at least a first unified device identity of at least a communication device of a first communication protocol in the network system, and at least a medium access control (MAC) address corresponding to the at least a first unified device identity; and
determining whether to perform management flame transmission to a second communication device of a second communication protocol in the network system according to the existence of a second unified device identity of the second communication device in the device table,
wherein the method of processing management frame for the first communication protocol and the second communication protocol is performed on a MAC Abstraction Sub-layer, and the first communication protocol is different from the second communication protocol.

2. The method of claim 1, wherein determining whether to perform the management frame transmission to the second communication device according to the existence of the second unified device identity of the second communication device in the device table comprises:
determining to perform the management frame transmission to the second communication device when the second unified device identity of the second communication device is found in the device table.

3. The method of claim 2, further comprising:
deriving an address of the second communication device by lookup the device table with the second unified device identity of the second communication device; and wherein determining to perform the management frame transmission to the second communication device when the second unified device identity of the second communication device is found in the device table comprises:
performing the management frame transmission to the second communication device according to the address of the second communication device when the second unified device identity of the second communication device is found in the device table.

4. The method of claim 2, wherein determining to perform the management frame transmission to the second communication device when the second unified device identity of the second communication device is found in the device table comprises:
transmitting a request frame to the second communication device when the second unified device identity of the second communication device is found in the device table; and
transmitting a response acknowledgement frame to the second communication device when a request acknowledgement frame and a response frame corresponding to the request frame are received from the second communication device.

5. The method of claim 2, wherein determining to perform the management frame transmission to the second communication device when the second unified device identity of the second communication device is found in the device table comprises:
    transmitting an indication frame to the second communication device when the second unified device identity of the second communication device is found in the device table; and
    receiving an indication acknowledgement frame corresponding to the indication frame from the second communication device when the indication frame is received by the second communication device.

6. The method of claim 2, wherein determining to perform the management frame transmission to the second communication device when the second unified device identity of the second communication device is found in the device table comprises:
    encapsulating the management frame to be a special Ethernet type frame for transmission to the second communication device when the second unified device identity of the second communication device is found in the device table, whereby the second communication device parses the special Ethernet type frame and then gets the management frame when receiving the special Ethernet type frame.

7. The method of claim 2, wherein determining to perform the management frame transmission to the second communication device when the second unified device identity of the second communication device is found in the device table comprises:
    performing the management frame transmission to the second communication device through a data path when the second unified device identity of the second communication device is found in the device table.

8. The method of claim 1, wherein determining whether to transmit the management frame to the second communication device according to the existence of the second unified device identity of the second communication device in the device table comprises:
    dropping the management frame when the second unified device identity of the second communication device is not found in the device table.

9. The method of claim 1, wherein the management frame includes information of at least one of destination device identity (DDID), source device identity (SDID), management frame type (MFT), management function class, management function type, sequence number (SN), management function data.

10. A first communication device of a network system for processing management frame, the first communication device comprising: a storage unit, for storing a device table including at least a first unified device identity of at least a communication device of a first communication protocol in the network system, and at least a medium access control (MAC) address corresponding to the first unified device identity; and a management frame process module, coupled to the storage unit, for determining whether to perform management frame transmission to a second communication device of a second communication protocol in the network system according to the existence of a second unified device identity of the second communication device in the device table,
    wherein the first communication device of the first communication protocol and the second communication device of the second communication protocol communicate through a MAC Abstraction Sub-layer, and the first communication protocol is different from the second communication protocol.

11. The first communication device of claim 10, wherein the management frame process module determines to perform the management frame transmission to the second communication device when the second unified device identity of the second communication device is found in the device table.

12. The first communication device of claim 11, wherein the management frame process module derives an address of the second communication device by lookup the device table with the second unified device identity of the second communication device, and then performs the management frame transmission to the second communication device according to the address of the second communication device when the second unified device identity of the second communication device is found in the device table.

13. The first communication device of claim 11, wherein the management frame process module transmits a request frame to the second communication device when the second unified device identity of the second communication device is found in the device table, and transmits a response acknowledgement frame to the second communication device when a request acknowledgement frame and a response frame corresponding to the request frame are received from the second communication device.

14. The first communication device of claim 11, wherein the management frame process module transmits an indication frame to the second communication device when the second unified device identity of the second communication device is found in the device table, and receives an indication acknowledgement frame corresponding to the indication frame from the second communication device when the indication frame is received by the second communication device.

15. The first communication device of claim 11, wherein the management frame process module encapsulates the management frame to be a special Ethernet type frame for transmission to the second communication device when the second unified device identity of the second communication device is found in the device table, whereby the second communication device parses the special Ethernet type frame and then gets the management frame when receiving the special Ethernet type frame.

16. The first communication device of claim 11, wherein the management frame process module performs the management frame transmission to the second communication device through a data path when the second unified device identity of the second communication device is found in the device table.

17. The first communication device of claim 10, wherein the management frame process module drops the management frame when the second unified device identity of the second communication device is not found in the device table.

18. The first communication device of claim 10, wherein the management frame includes information of at least one of destination device identity (DDID), source device identity (SDID), management frame type (MFT), management function class, management function type, sequence number (SN), management function data.

* * * * *